Figure 1:
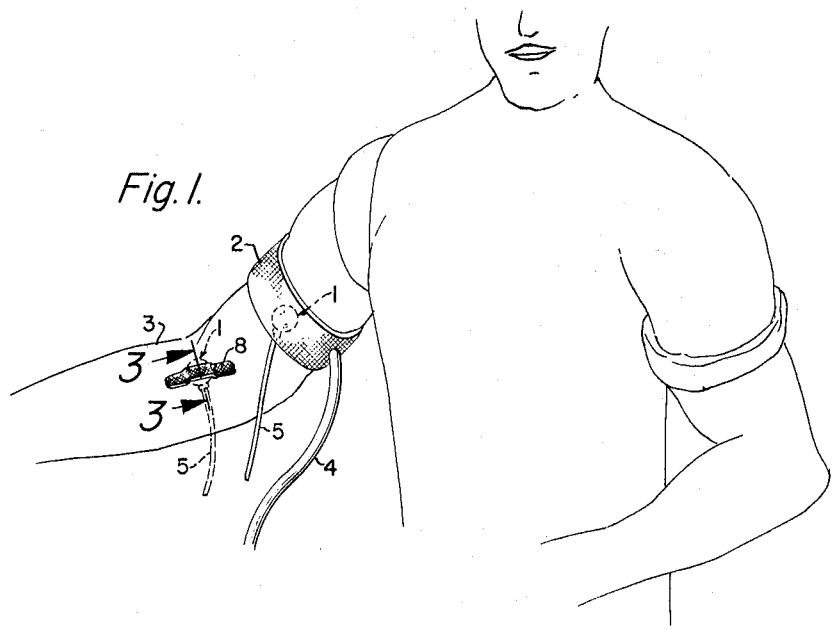

March 8, 1966 R. L. BURKHALTER ETAL 3,239,696
PIEZOELECTRIC PRESSURE TRANSDUCER
Filed June 20, 1962

INVENTORS
ROY L. BURKHALTER,
CHARLES W. KAYSER,
BY
Luther P. Speck
Attorney.

3,239,696
PIEZOELECTRIC PRESSURE TRANSDUCER
Roy L. Burkhalter, Torrance, and Charles W. Kayser, Gardena, Calif., assignors to The Garrett Corporation, Los Angeles, Calif., a corporation of California
Filed June 20, 1962, Ser. No. 208,173
7 Claims. (Cl. 310—8.6)

In the pressure transducer of this invention, a thin piezoelectric crystal of planar configuration is incorporated in a novel structural arrangement to provide a pick-up devise characterized by high sensitivity, exceptional unidirectionality of response, small size, light weight, and thinness of profile. A typical embodiment of this novel transducer may be designed to respond to pressure-variations at frequencies extending from subaudio into, at least, the audio range. This novel transducer is useful, for example, in sphygmomanometry to measure the systolic and diastolic limits of blood pressure variation by sensing the relatively minute internal pressure changes which occur periodically in a region of partially-occluded arterial blood flow.

The blood pressure of living organisms having cardiovascular circulatory systems varies between maximum, or systolic, and minimum, or diastolic, limits. It is common practice in the prior art to measure the systolic and diastolic limits of blood pressure variation through the use of auscultatory techniques. One example of these techniques involves occlusion of arterial blood flow by encircling a limb of the subject with an inflatable cuff, and then increasing the pneumatic pressure of the cuff until arterial blood flow ceases, a condition ordinarily detected with a stethoscope and signified by the absence of the auscultatory sound of blood spurting periodically through the constricted artery. The pneumatic pressure of the cuff is then reduced gradually until the auscultatory sounds reappear. These sounds reappear when the diminishing cuff pressure becomes equal to the systolic, or maximum, limit of blood pressure variation within the cardiovascular system of the subject.

The auscultatory sounds reoccur at heartbeat frequency as long as the pressure of the cuff is sufficient to constrict and impede the flow of blood through an encircled artery. However, when the cuff pressure has diminished sufficiently, the auscultatory sounds disappear once more. This occurs when the cuff pressure becomes equal to the diastolic, or minimum, limit of blood pressure variation in the subject. Hence, it is possible to ascertain the systolic and diastolic limits of blood pressure variation merely observing the respective values of pneumatic cuff pressure when auscultatory sounds first appear, and later when they disappear.

Through use of a sphygmomanometer the need for a stethoscope and trained listener to detect the advent and disappearance of auscultatory sounds is obviated. In this instrument, the functions of stethoscope and listener are replaced with an electrical, hydraulic or mechanical pressure-responsive device and a visual indicator. Obviously, this is advantageous in many situations because the need for human participation in detecting the systolic and diastolic limits of blood pressure variation is eliminated. The most common device used in sphygmomanometry to detect auscultatory sounds is a mechanical-to-electrical pressure transducer.

In sphygmomanometry it has been common practice to use small transducers of the microphone type for detecting auscultatory sounds. A typical stenographer's earpiece, for example, is small enough for insertion between the inflatable cuff and a limb of the subject. Small microphones of the lapel type also are feasible for this application. Although these devices have been used with success in relatively quiet environments, they have been wholly unsatisfactory for use under circumstances where the ambient noise level is high. This is true because these devices have a thin, peripherally-supported diaphragm designed to respond to compressional waves in air.

In conventional microphones, a degree of immunity to spurious atmospheric noises is achieved, if at all, as a result of directional response characteristics attributable, usually to the acoustic insulating effect of the walls of the diaphragm housing, and, in some cases, through the use of a separate layer of acoustic insulating material disposed within the housing. Although atmospheric pressure waves approaching the diaphragm from its acoustically-shielded side are attenuated to some extent, this method of achieving directionality of response has been found to be unsatisfactory for use in sphygmomanometry under high ambient noise conditions. Under these circumstances, spurious compressional waves, or noises, are consequential because the amplitude of the auscultatory sounds is relatively low as compared to the amplitude of spurious noises reaching the diaphragm. Furthermore, the diaphragms of transducers of the microphone type are effectively suspended in air for response mainly to pressure variations in gaseous media. As a result, these devices have relatively efficient coupling coefficients and strong response to spurious noises in the surrounding atmosphere. Response to spurious noises spoils the signal representing the auscultatory sounds, and renders the sphygmomanometer system inaccurate if not useless.

Although other types of mechanical-to-electrical pressure transducers have a high degree of immunity to spurious pressure variations in various media, their immunity is achieved largely as a result of highly directional response characteristics. Many of these transducers also incorporate piezoelectric pressure-sensitive elements mounted for efficient coupling to various pressure-transmitting media. These transducers, however, are unsuitable for use in sphygmomanometry on account of their considerable bulk and weight.

From the foregoing it should be apparent that a pressure transducer suitable for use in sphygmomanometry should be small, lightweight, and thin in profile. In addition, it should have a unidirectional response characteristic, and its transducing element should be mounted so that an optimum impedance match will exist between it and the flesh of the subject. This will provide maximum sensitivity to internal sounds, and minimum sensitivity to compressional waves in the surrounding atmosphere. In addition, the transducer should be relatively insensitive to spurious compressional waves occurring outside the flesh of the subject. These important attributes are achieved in the transducer of this invention through use of an ingenious structural and functional arrangement.

Accordingly, the objects of this invention are to provide:

(1) A unidirectional piezoelectric pressure transducer characterized by high sensitivity, light weight, exceptional unidirectionality of response, small size, and thinness of profile;

(2) A unidirectional piezoelectric pressure transducer of thin profile selectively responsive to pressure variations developed in living flesh or like pressure-transmitting media, and useful especially in sensing and transducing auscultatory sounds developed within the body of a living organism when blood flows through a partially-constricted artery; and (3) A unidirectional piezoelectric pressure transducer of extremely thin profile responsive to pressure waves in living flesh, or other like, incompressible pressure-transmitting media, and characterized by virtual immunity to spurious pressure waves in an ambient compressible fluid medium.

An exemplary embodiment of the pressure transducer of this invention generally comprises a flat, cylindrical housing having a circular recess in one side for accommodating a two-layer piezoelectric crystal having its peripheral edges and one side embedded in a rubberlike potting compound. A diaphragm, disposed over the opening of the recess in coplanar relation with the surface of the disk, is soldered to the exposed surface of the crystal. An electrical conductor, soldered to the embedded surface of the crystal, extends through an appropriate opening in the edge of the housing. The surfaces of the housing adjacent to its periphery are rounded to provide a comfortable engagement with the flesh of the subject, and a relatively long path through the flesh of the subject for spurious pressure waves traveling from the atmosphere to the diaphragm. Furthermore, the inertial mass of the housing around the edge of the diaphragm results in a highly-inefficient coupling between spurious pressure waves in the surrounding atmosphere and the diaphragm.

Figure 2:
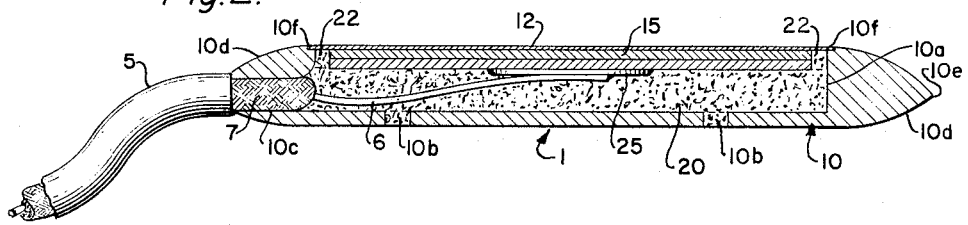
Figure 3:
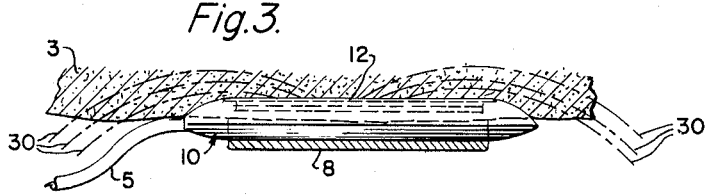

The preceding text is intended to summarize and explain the significance of this invention in relation to the problems which it resolves, and should not be construed to limit the invention. For a more complete understanding of the structure, operation, and novel features of a preferred embodiment, consider the following description with reference to the drawing, wherein:

FIG. 1 portrays the manner in which a piezoelectric transducer in accordance with this invention may be attached at various locations to the arm of a subject to sense auscultatory sounds occurring between systolic and diastolic limits of arterial blood pressure;

FIG. 2 represents an enlarged longitudinal cross section of the improved piezoelectric transducer of this invention; and FIG. 3 is a cross-sectional view of the transducer taken along the plane 3—3 of FIG. 1 to represent the manner in which the rim of the housing engages the flesh of the subject to increase the effective length of the path of travel of spurious atmospheric pressure waves to the diaphragm.

As shown in FIG. 1, the thin profile of the piezoelectric transducer 1 of this invention facilitates its installation between the inflatable cuff 2 and the arm 3 of a subject. For this purpose thinness is desirable in order to minimize the possibility of error resulting from concentration of the constrictive force of the cuff 2 on the artery. This must be avoided if the respective pneumatic cuff pressure at which auscultatory sounds reappear and disappear are to register accurately the systolic and diastolic limits of blood pressure variation. Through use of the ingenious concepts of this invention, for example, a piezoelectric transducer having virtually total immunity to spurious atmospheric pressure waves and a thickness of only 0.14 inch has been constructed. This makes it possible to obtain, in terms of corresponding cuff pressures, accurate readings of systolic and diastolic blood pressure under the most adverse environmental noise conditions.

The pneumatic cuff 2 has a flexible tube 4 normally coupled to a suitable source of fluid pressure (not shown) variable between limits exceeding the systolic and diastolic blood pressure limits of the subject. Furthermore, the transducer 1 is provided with an appropriate cable 5 to facilitate its connection to a signal amplifier (not shown) for increasing the auscultatory-sound representative signals to an amplitude suitable for use in providing an aural or visual indication of their presence.

An alternative location for installation of transducer 1 on the arm 3 of the subject is represented by the dotted lines of FIG. 1 as being adjacent to the path of arterial blood flow, and downstream from the pneumatic cuff 2. In this instance, the transducer 1 may be secured removably in position by a strip of adhesive 8, or other conventional means. The auscultatory pressure waves developed in the region of constricted arterial blood flow beneath cuff 2 effectively are transmitted through the blood contained within the artery downstream from the constricted region. It should be understood, of course, that the locations of transducer 1 portrayed in FIG. 1 are merely illustrative; the operator may change the location to other points adjacent to the artery and its branches downstream from the constricted region to suit his convenience.

As represented in FIG. 2, the transducer 1 generally is comprised of a flat, circular housing 10 having a cylindrical recess 10a provided in one side, a thin flexible diaphragm 12 disposed across the opening of recess 10a and in coplanar relation with the contiguous surface of housing 10, and a flat, piezoelectric crystal 15 having one surface disposed in contiguous relation with the inner surface of diaphragm 12, and its remaining surfaces embedded in a rubberlike potting compound 20 filling the remaining space of recess 10a.

The housing 10, made of stainless steel, aluminum, or other corrosion resistant material, has a plurality of small openings 10b communicating with the recess 10a. The openings 10b make it possible to fill the empty space within recess 10a with potting compound after the diaphragm 12 and piezoelectric crystal 15 have been installed. To accommodate cable 5, a hole 10c is provided between the wall of recess 10a and the periphery of housing 10. It should be noticed that the principal mass of the housing 10 is in a rim 10d formed between the wall of recess 10a and the outer periphery. The rim 10d has rounded surfaces which converge gently to form the peripheral edge 10e. The mass and configuration of rim 10d strengthen housing 10, provide a comfortable and substantial surface area to engage the flesh of the subject, and lengthen the path of travel of unwanted pressure waves from the surrounding atmosphere through the flesh to the diaphragm 12. The relatively large mass and radial dimension of rim 10d insures that the coupling of spurious atmospheric pressure variations to the diaphragm 12 will be zero, or at least inconsequential. An annular shelf 10f around the opening of recess 10a makes it possible to install the diaphragm 12 so that its outer surface will be in coplanar relation with the outer surface of the housing 10.

The diaphragm 12, made of stainless steel or other corrosion resistant material, is thin and highly flexible. For example, in an actual embodiment of the piezoelectric transducer of this invention, the diaphragm 12 was made of stainless steel having a thickness of 0.005 inch, and was spot welded around its periphery to the annular shelf 10f. The thinness of diaphragm 12 minimizes attenuation of auscultatory pressure waves through the flesh of the subject, while providing adequate protection for piezoelectric crystal 15. The thinness of the diaphragm 12 is made possible by the physical support provided by potting compound 20.

The piezoelectric crystal 15, formed by two layers of barium titanate, is conventional. The diameter of the crystal is somewhat less than that of housing recess 10a so that an endless gap 22 will be formed between the wall of recess 10a and the periphery of crystal 15 when the latter is installed. A copper disk 25 is secured to one surface of crystal 15 with conductive cement or solder, and the other side of the crystal 15 is soldered to the inner surface of he diaphragm 12. The copper disk 25 facilitates an electrical connection between the central conductor 6 of cable 5 and the inner side of crystal 15. The other side of crystal 15 is connected electrically to the conductive shield 7 of cable 5 via the diaphragm 12 and the housing rim 10d. The cable 5 is held securely in hole 10c, preferably with solder or cement.

The potting compound 20 fills the space remaining in housing recess 10a after the installation of diaphragm 12 and crystal 15. In an actual embodiment of this transducer, the potting compound was silicone rubber. This thermoplastic material may be liquefied and introduced into recess 10a through openings 10d. Upon cooling it forms a resilient solid having pressure-wave transmission characteristics similar to those of the flesh of the subject. In addition to establishment of a good impedance match to the flesh of the subject, the potting compound 20 acoustically insulates against the transmission of atmospheric pressure variation to the diaphragm 12 through the housing 10, and aids the diaphragm 12 in providing physical support for the crystal 15. In accordance with an important feature of this invention, the endless gap 22 between the edges of crystal 15 and the wall of housing recess 10a is filled with potting compound 20. It has been found that this feature markedly attenuates transmission to the portion of diaphragm 12 coupled to crystal 15 of spurious vibrations induced in the housing 10 by atmospheric pressure variations. Inasmuch as diaphragm 12 is very thin, the potting compound 20 in gap 22 effectively damps the transverse components of spurious vibrations seeking to cross the endless gap 22 from the housing 10 to the crystal 15.

The functional features of piezoelectric transducers in accordance with this invention are represented more vividly in FIG. 3. This illustration shows clearly how the housing 10 of the transducer indents the flesh of the subject under slight pressure from a strip of adhesive 8 utilized to hold the transducer in place. As a result of the engagement between the housing rim 10d and the skin of the subject, pressure waves from the atmosphere either must travel along an extended path represented by the dotted lines 30 through the flesh of the subject, or must induce vibrations in crystal 15 via the housing 10, diaphragm 12, and potting compound 20. As explained above, the latter path of spurious atmospheric pressure waves virtually is closed on account of the thinness of diaphragm 12 and the presence of potting compound 20 in the endless gap betwen edges of the crystal 15 and the wall of housing recess 10a.

Thus, a piezoelectric transducer embodying the features of this invention is characterized by diminutive size, thin profile, light weight, high sensitivity to auscultatory pressure variations occurring within the flesh of the subject, and virtually complete immunity to spurious pressure variations present in the surrounding atmosphere when the transducer is used in sphygmomanometry under adverse noise conditions.

It should be noticed that the degree of coupling and the rate of attenuation of atmospheric pressure variations in the flesh of the subject are such that virtually no spurious pressure waves can travel along the path 30 to the active portion of diaphragm 12. Accordingly, the only pressure variations reaching the portion of diaphragm 12 contiguous with crystal 15 are those representing the auscultatory sounds developed as a result of constricted arterial blood flow.

It is anticipated that the novel concepts inherent in this invention and expressed or inferrable from the drawings and text of this disclosure will enable the design of a variety of embodiments within the scope of this invention.

We claim:

1. A pressure transducer highly immune to spurious noises, and especially useful as the auscultatory detector of a sphygmomanometer, the said transducer comprising:
   a housing of waferlike configuration having a recess located centrally in one side, and a rim having on the same side as the recess opening and endless surface of substantial width for engaging a pressure transmitting medium;
   a diaphragm disposed over the opening of the recess;
   a flat piezoelectric crystal having outer dimensions somewhat less than the inner dimensions of the recess, and disposed within the recess with one flat surface in contiguous relation with the inner surface of the diaphragm;
   means in the unoccupied space of the recess for enhancing the transduction of mechanical energy from a pressure transmitting medium in contiguous relation with a central portion of the diaphragm into an analogous electrical signals;
   and means coupled to the crystal for conducting electrical signals developed by the latter to utilization apparatus.

2. A pressure transducer highly immune to spurious noises, and especially useful as the auscultatory detector of a sphygmomanometer, the said transducer comprising:
   a housing of waferlike configuration having a recess located centrally in one side, and a rim of relatively great mass as compared to the remainder of the housing and having on the same side as the recess opening and endless surface of substantial width for engaging a pressure-transmitting medium;
   a diaphragm disposed over the opening of the recess;
   a flat piezoelectric crystal having outer dimension somewhat less than the inner dimension of the recess, and disposed within the recess with one flat surface in contiguous relation with the inner surface of the diaphragm;
   means in the unoccupied space of the recess for enhancing the transduction of changes in mechanical energy occurring in a pressure-transmitting medium in contiguous relation with a central portion of the diaphragm into analogous electrical signals;
   and means coupled to the crystal for conducting electrical signals developed by the latter to utilization apparatus.

3. A pressure transducer highly immune to spurious noises comprising:
   a housing of waferlike configuration having a recess located centrally in one side and a rim having on the same side as the recess opening an endless surface of substantial width for engaging a pressure-transmitting medium;
   a diaphragm disposed over the opening of the recess;
   a circular flat piezoelectric crystal having planar dimensions and a thickness somewhat less, respectively, than the opening dimensions and depth of the recess, and disposed in the recess with one surface in contiguous relation with a central portion of the diaphragm to form an endless gap between the crystal and the walls of the recess;
   means in the endless gap for attenuating spurious vibrations induced in the housing as a result of pressure waves in a compressible, pressure-transmitting medium in contact with the housing;
   and means coupled to the crystal for conducting electrical signals developed by the latter to utilization apparatus.

4. A pressure transducer highly immune to spurious noises comprising:
   a housing of waferlike configuration having a circular recess located centrally in one side, and a rim having on the same side as the recess opening an endless surface of substantial radial dimension for engaging a pressure-transmitting medium;
   a diaphragm disposed over the opening of the recess;
   a circular piezoelectric crystal having a diameter and thickness somewhat less, respectively, than the diameter and depth of the recess, and disposed in the recess with one surface in contiguous relation with a central portion of the diaphragm to form an endless gap between the crystal and the recess;
   means in the endless gap for attenuating spurious vibrations induced in the housing as a result of pressure waves in a first compressible, pressure-transmitting medium in contact with the housing, and filling at least a portion of the remaining unoccupied space between the other surface of the piezoelectric crystal and the housing for enhancing the transduction of changes in mechanical energy occurring in a second incompressible medium in contiguous relation with a central portion of the diaphragm into analogous electrical signals;

and means coupled to the crystal for conducting electrical signals developed by the latter to utilization apparatus.

5. A pressure transducer highly immune to spurious noises comprising:

a housing of waferlike configuration having a circular recess located centrally in one side, and a rim having on the same side as the recess opening an endless surface of substantial radial dimension for engaging a pressure-transmitting medium;

a diaphragm disposed over the opening of the recess;

a circular piezoelectric crystal having a diameter and thickness somewhat less, respectively, than the diameter and depth of the recess, and disposed in the recess with one surface in contiguous relation with a central portion of the diaphragm to form an endless gap between the peripheral edge of the crystal and the wall of the recess;

means in the endless gap for attenuating spurious vibrations induced in the housing as a result of pressure waves in a first compressible, pressure-transmitting medium in contact with the housing, and filling at least a portion of the remaining unoccupied space between the other surface of the piezoelectric crystal and the housing for enhancing the transduction of changes in mechanical energy occurring in a second incompressible medium in contiguous relation with a central portion of the diaphragm into analogous electrical signals while attenuating the pressure waves of the first medium;

and means coupled to the crystal for conducting electrical signals developed by the latter to utilization apparatus.

6. A pressure transducer highly immune to spurious noises, and especially useful for application contigually to the flesh of a subject having a cardiovascular system, and in proximity to a region of constricted arterial flow, to detect auscultatory pressure variations indicative of the blood pressure and other cardiovascular phenomena, the said transducer comprising:

a housing of waferlike configuration having a circular recess located centrally on one side, and a rim having on the same side as the opening of the recess an endless surface of substantial radial dimension for engaging a first incompressible, pressure-transmitting medium made up, for example, of the flesh of the subject to produce an effective seal against penetration to the opening of the recess of spurious pressure waves from a second compressible pressure-transmitting medium made up, for example, of the surrounding atmosphere;

a diaphragm disposed over the opening of the recess;

a circular piezoelectric crystal having a diameter and thickness somewhat less, respectively, than the diameter and depth of the recess, and disposed in the recess with one surface in contiguous relation with a central portion of the diaphragm to form an endless gap between the peripheral edge of the crystal and the wall of the recess;

means in the endless gap for attenuating spurious vibrations induced in the housing as a result of pressure waves in the second medium;

and means coupled to the crystal for conducting electrical signals developed by the latter to utilization apparatus.

7. A pressure transducer highly immune to spurious noises, and especially useful for application contigually to the flesh of a subject having a cardiovascular system, and in proximity to a region of constricted arterial flow, to detect auscultatory pressure variations indicative of blood pressure and other cardiovascular phenomena, the said transducer comprising:

a housing of waferlike configuration having a circular recess located centrally on one side, and a rim having on the same side as the opening of the recess an endless surface of substantial radial dimension for engaging a first incompressible, pressure-transmitting medium made up, for example, of the flesh of a subject to produce an effective seal against penetration to the opening of the recess of spurious pressure waves from a second compressible, pressure-transmitting medium made up, for example, of the surrounding atmosphere;

a diaphragm disposed over the opening of the recess;

a circular piezoelectric crystal having a diameter and thickness somewhat less, respectively, than the diameter and depth of the recess, and disposed in the recess with one surface in contiguous relation with a central portion of the diaphragm to form an endless gap between the peripheral edge of the crystal and the wall of the recess;

means in the endless gap for attenuating spurious vibrations induced in the housing as a result of pressure waves in the second medium, and filling at least a portion of the remaining unoccupied space between the other surface of the piezoelectric crystal and the housing for enhancing the transduction of mechanical energy from the first medium when the latter is in contiguous relation with a central portion of the diaphragm into analogous electrical signals, while attenuating pressure waves of the first medium;

and means coupled to the crystal for conducting electrical signals developed by the latter to utilization apparatus.

References Cited by the Examiner

UNITED STATES PATENTS

| Re. 20,680 | 3/1938 | Sawyer | 310—8.6 X |
|---|---|---|---|
| 2,193,945 | 3/1940 | Strauss | 128—2.05 |
| 2,270,167 | 1/1942 | Meissner | 310—8.6 X |
| 2,313,129 | 3/1943 | Dohan | 310—8.6 |
| 2,518,331 | 8/1950 | Kalin | 310—8.6 |
| 2,614,144 | 10/1952 | Howatt | 310—8.6 |
| 2,702,354 | 2/1955 | Chorpening | 310—8.6 |
| 2,748,369 | 5/1956 | Smyth | 340—10 |
| 2,875,352 | 2/1959 | Orlacchio | 310—8.7 |
| 2,972,068 | 2/1961 | Howry et al. | 310—8.7 |

ORIS L. RADER, *Primary Examiner.*

R. J. HOFFMAN, MILTON O. HIRSHFIELD,

*Examiners.*